United States Patent [19]

Lohmar et al.

[11] Patent Number: 4,839,397

[45] Date of Patent: Jun. 13, 1989

[54] POLYURETHANE SOFT FOAM WITH SOUND INSULATING AND VIBRATION DAMPING PROPERTIES

[75] Inventors: Ernst Lohmar, Adelheidsdorf; Gerhard Burak, Wienhausen, both of Fed. Rep. of Germany

[73] Assignee: Dr. Alois Stankiewicz GmbH, Adelheidsdorf, Fed. Rep. of Germany

[21] Appl. No.: 174,692

[22] Filed: Mar. 29, 1988

[30] Foreign Application Priority Data

Mar. 31, 1987 [DE] Fed. Rep. of Germany ....... 3710731

[51] Int. Cl.$^4$ ............................................ C08G 18/14
[52] U.S. Cl. ................................... 521/159; 264/45.4; 264/46.7; 264/51; 521/174
[58] Field of Search ............... 521/159, 174; 264/45.4, 264/46.7, 51

[56] References Cited

U.S. PATENT DOCUMENTS 4,544,678 10/1985 Hesman ............................... 521/174

FOREIGN PATENT DOCUMENTS 1923161 11/1970 Fed. Rep. of Germany .
2756622 2/1979 Fed. Rep. of Germany .
2835329 3/1980 Fed. Rep. of Germany .
3313624 10/1984 Fed. Rep. of Germany .
3510932 10/1986 Fed. Rep. of Germany .

*Primary Examiner*—Maurice J. Welsh
*Attorney, Agent, or Firm*—Scully, Scott, Murphy & Presser

[57] ABSTRACT

The present invention relates to polyurethane foam materials with sound insulating and vibration damping properties. They are obtainable by reacting a polyisocyanate or polyisocyanate prepolymers with an excess of polyols or a mixture thereof while maintaining an NCO index of $\leq 80$, in particular $\leq 70$ and as a result they have an adhesive (frictional) surface and are further characterized by a density of 80 to 250 kg/m$^3$, a modulus of elasticity less than 300 000 N/m$^2$ and a loss factor of at least 0.4. The production is preferably done by adding the reaction components (polyol system on the one hand and polyisocyanate system on the other) to the mixture head of an RIM machine. The polyurethane soft foam materials with an adhesive surface according to the invention are particularly suitable for use as vibration damping sound insulation systems in automobiles.

16 Claims, 3 Drawing Sheets

POLYURETHANE SOFT FOAM WITH SOUND INSULATING AND VIBRATION DAMPING PROPERTIES

TECHNICAL FIELD OF THE INVENTION

The present invention relates to a polyurethane soft foam which is particularly suitable for sound insulation. It is characterised in that besides an air-borne sound absorption and sound insulation effect in mass-spring systems, the vibration damping effect can also be used for sound insulation, since on account of its surface properties good contact is possible with a metal sheet that is to have its vibration damping.

BACKGROUND OF THE INVENTION AND PRIOR ART

While various polyurethane soft foam materials are known for sound insulation, they are, unlike the foam according to the invention, not suitable for damping vibration. Thus DE-AS No. 19 23 161 and DE-OS No. 28 35 329 describe foam materials filled with minerals which, due to their great weight per unit volume of 0.5 to 1.25 kg/dm$^3$, enable good sound insulation to be obtained. It is however not possible to damp the vibration of sheet metal with these materials as the loss factor of these foams is too small.

While it is true that DE-PS No. 27 56 622 is concerned with manufacturing foam materials with high loss factors, the process described, namely the impregnation of open-pored polyurethane or PVC foams with viscoelastic raw materials, e.g. polyolefins or organic resins or waxes containing inorganic filling materials, is very expensive.

DE-PS No. 33 13 624 is also concerned with the manufacture of a polyurethane soft foan with a high loss factor. However, the viscoelastic properties cannot be used as they are for damping vibration of sheet metal, such as e.g. bodywork floor assemblies and front walls in motor vehicles, because in order to damp vibration there has to be a coupling between the sheet whose vibration is to be damped and the viscoelastic material. This is not possible in the case of the known foam materials without using supplementary means. For this reason compact materials for damping vibration are today melted on to vehicle floor assemblies. This is a very expensive procedure. As the melting processes are generally carried out before or during painting of the bodywork, problems of paint soiling arise. Melting in separate ovens is associated with a great expenditure of energy, so that there is considerable interest in performing the vibration damping without separate melting processes.

An attempt has also been made (DE-OS No. 35 10 932) to use the viscoelastic properties of a foam material by applying adhesive coatings for coupling between sheet metal and foam, but the process involves additional expenditure.

OBJECT OF THE INVENTION

The object of the invention is therefore to provide a polyurethane foam that does not have these disadvantages and, besides improving the absorption of air-borne sound and damping of air-borne sound in so-called mass-spring systems, additionally makes it possible to damp the vibration of sheet metal.

SUMMARY OF THE INVENTION

This object has been achieved by the provision of a polyurethane soft foam which, owing to its composition, has an intrinsically adhesive surface and in addition a loss factor of over 0.4.

It has been discovered that the adhesive (frictional) properties which are required for the purpose of transferring damping properties, are dependant on the code number (NCO index) of a polyurethane mixture. Surprisingly, and not foreseeable by the man skilled in the art, it was discovered that optimal adhesive (frictional) properties are only attainable with code numbers between 80 and 50 (cf. FIG. 2). In addition it was also not foreseeable that just in this range of the code numbers good damping properties of the foam can also be obtained (cf. FIG. 1).

Polyurethane foams with this combination of properties are novel and were not known until now; they open up the broader possibilities, described in the statement of object, for new concepts for sound insulation and are thus of considerable interest.

The foams according to the invention are also suitable for foam backing heavy foils and carpets so that air-borne sound insulation properties can also be used besides the vibration damping effect. Owing to their low modulus of elasticity they are also suitable for use as springs in mass-spring systems.

The present invention therefore relates to a soft foam of polyurethane for sound insulation purposes, having an adhesive surface, which is obtained by reaction of a polyisocyanate or a polyisocyanate prepolymer with an excess of polyols or mixtures thereof employing an NCO index of $\leq 80$, more particularly $\leq 70$, and which has a density of 80 kg/m$^3$–250 kg/m$^3$, a modulus of elasticity of less than 300,000 N/m$^2$ and a loss factor of at least 0.4.

Examples of suitable polyols are polyether polyols, particularly those based on ethylene oxide and/or propylene oxide. Suitable polyisocyanates other than diphenylmethane-4.4-diisocyanate with an NCO content of 31% based on MDI, are those with different NCO contents.

The production of the foam according to the invention preferably takes place by means of the RIM (Reaction Injection Moulding) process. In this manner foam parts can also be produced in a composite with other materials, such as e.g. textile inserts, fleece inserts, foam backing for heavy layers or carpets and textile materials. The residence time in the mould can be limited by means of accelerators to under 3 minutes which enables an economic production of shaped parts.

The foam according to the invention is produced according to the state of the art rules for cold form foams (e.g. G. Woods "Flexible Polyurethane Foams", Chemistry and Technology, 1982, 206 ff).

The crucial factor in this case however, is that care is taken to keep the code number in the above-mentioned range.

BRIEF DESCRIPTION OF THE DRAWINGS

The invention will be described in more detail with reference to the examples which are explained in greater detail below, and to drawings, in which.

DETAILED DESCRIPTION OF PREFERRED EMBODIMENTS OF THE INVENTION

Examples

Figure 2:
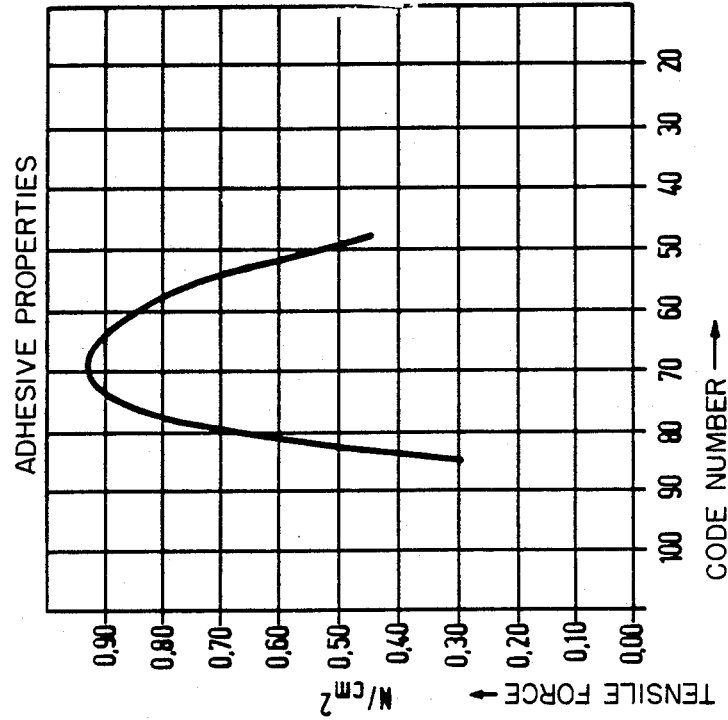
FIGS. 1 and 2 show properties of the foam material obtained, FIGS. 3 and 4 sow in different forms, a sound insulating adhesive insulating system as a wall coating, coated on a wall part formed by a profiled metal sheet, which employs the polyurethane soft foam material according to the invention.

Various kinds of foam materials were produced according to the following standard formulation:

Composition A:

| | |
|---|---|
| 48.0 parts/wt. | polyetherpolyol on a propylene oxide-ethylene oxide basis (42 mg KOH/g, mol. wt. 4000) |
| 18.0 parts/wt. | castor oil (160 ± 10 mg KOH/g, equivalent weight. 340 ± 20) |
| 26.0 parts/wt. | polypropylene glycol (250 mg KOH/g, mol. wt. 450) |
| 6.0 parts/wt. | polyetherpolyol on a polyethylene oxide and propylene oxide basis (28 mg KOH/g. mol. wt. 4900) (cell regulator) |
| 1.0 parts/wt. | distilled water (blowing agent) |
| 1.0 parts/wt. | additive (such as dimethylethanolamine, dibutyltin dilaurate) |
| 100.0 parts/wt. | |

Composition B:

diphenylmethane-4.4-diisocyanate (NCO content: 31%)

The components A and the components B were then added to the mixing head of a RIM machine in the proportions given in the following table and foamed in a mounted to an open pored foam part. It was removed from the mould after 3 minutes.

Figure 1:
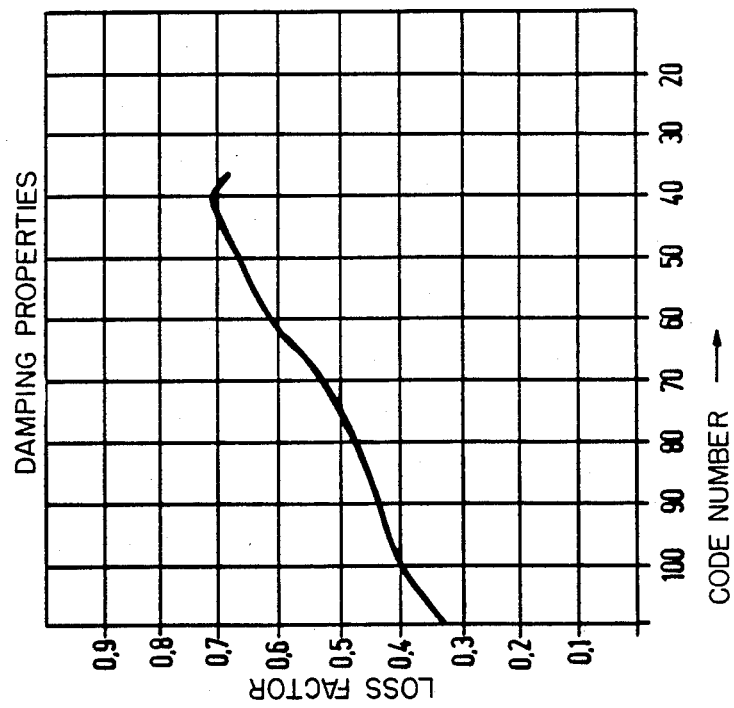

The properties of the foam material obtained are given in the table and in FIGS. 1 and 2. The weight per unit volume of the foam material was approx. 120 g/dm$^3$.

TABLE

Technical-physical data

| Code No. | Proportion of MDI (31% NCO content) to 100 pts./wt. comp. A | Compression hardness (DIN 53576 process C) | | | Modulus of elasticity N/m$^2$ |
|---|---|---|---|---|---|
| | | 20% | 30% | 50% | |
| KZ 100 | 44.6 pts./wt. | 15 | 22 | 32.5 N | ca. 280,000 |
| KZ 75 | 33.5 pts./wt. | 13 | 17 | 22.5 N | ca. 240,000 |
| KZ 65 | 29.0 pts./wt. | 11.0 | 14.0 | 20.0 N | ca. 190,000 |
| KZ 60 | 26.8 pts./wt. | 8.5 | 10.0 | 14.5 N | ca. 170,000 |
| KZ 50 | 22.4 pts./wt. | 5.5 | 7.0 | 11.0 N | ca. 150,000 |

Determination of the adhesive (frictional) properties was carried out as follows:

| | |
|---|---|
| Test set-up: | 1. Universal testing machine of Fa. Frank, Weinheim, type 21004, upper plate 50 × 50 mm Lower plate 200 × 200 mm. |
| | 2. Sample size 50 × 50 mm |
| | 3. Speed 25 mm/min. |
| Test procedure: | The samples are compressed 4 mm (force pressure cell 500 N) and the force applying means of the machine are zeroed. The plate was then moved upwards at 25 mm/min and the force on separtion noted. After each sample the plates were cleaned with cleansing agent |

TABLE-continued

60/95.

Figure 4:
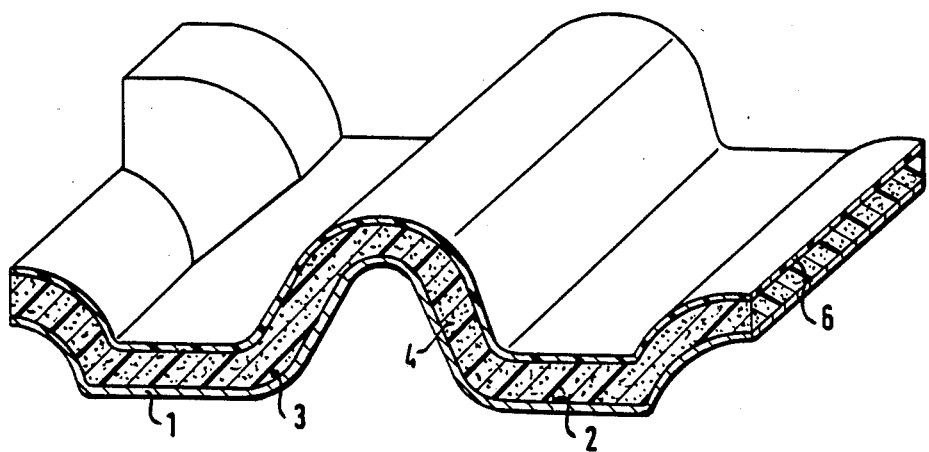
Figure 5:
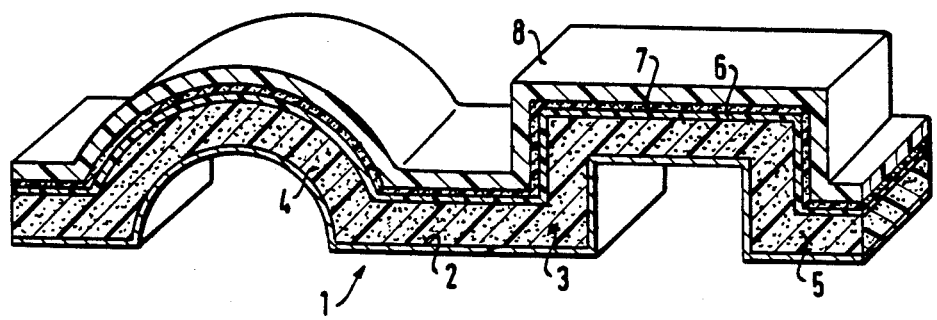
FIGS. 5 and 6 show, in different forms corresponding to FIGS. 3 and 4, a sound insulating system as a wall coating with a carpet laid over a decoupler.
Figure 6:
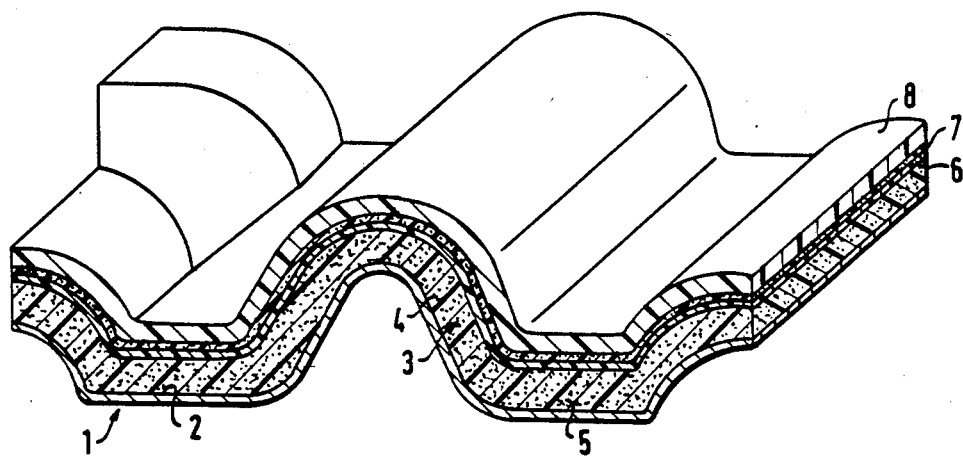

The use of the polyurethane soft foam materials according to the invention will be explained in more detail with reference to FIGS. 4 and 4, and 5 and 6 respectively.

The metal sheet forming the wall part 1 as the substrate has profiles which are followed by the wall coating, which is formed as a moulding, namely an insulation system 3 with a carpet 8 arranged over it, the same thickness of the wall coating always being maintained. The wall coating is applied to the wall part adhesively without having to use glue through the adhesion at position 2 of the insulation system 3 comprising polyurethane soft foam material according to the invention.

The wall coating thus consists of the insulation system, 3 which in turn has as a so-called spring 4, 5, the polyurethane soft foam material and a mass 6 of filled plastics material forming a heavy layer. Local differences in the sound damping ability can be obtained by putting the springs 4, 5 on over part of the surface. If necessary uniform sound damping over the whole surface can be obtained by putting the springs 4, 5 on correspondingly over the whole surface.

The adhesive forces of the springs 4, 5 themselves can be altered almost continuously during the production of the insulation system 3, by corresponding control of the mixture ratio. In addition in the case of substantially uniform thickness and local differences in the sound damping ability only a single, simple question is necessary in which, if necessary, stiffening coatings can be put on additionally. According to FIG. 4 and 5, in covering the wall there is now provided, between the heavy layer 6 and the carpet 8 arranged on top of it, a decoupler 7 of a soft elastic, predominately open pored material, preferably a foam material or fleece or felt that has a similar acoustic effect. This decoupler 7 is applied as a thin layer with a thickness in the region of about 5 mm. The decoupler 7 prevents the reduction of the bending strength which can otherwise be detected when a carpet is placed on the insulating system. Moreover it is surprisingly found that not only is the acoustic effect simultaneously maintained but as a rule it is even improved. In addition such an arrangement is simple to work in the usual manner.

What is claimed is:

1. Polyurethane foam materials with sound insulating and vibration damping properties, obtainable by reacting a polyisocyanate or polyisocyanate prepolymer with an excess of polyols or mixtures thereof whilst maintaining an NCO index of $\leq 80$, for the purpose of obtaining an adhesive surface and further characterized by a density of 80 to 250 kg/m$^3$, a modulus of elasticity of $<300,000$ N/m$^2$ and a loss factor of at least 0.4.

2. A process of producing a polyurethane soft foam material according to claim 1, characterized in that the components containing a polyisocyanate or polyisocyanate prepolymer are caused to react with the components containing an excess of polyols whilst maintaining an NCO index of $<80$, by feeding into the mixture head of a RIM arrangement.

3. An article of manufacture comprising a polyurethane soft foam material with an adhesive surface adhered to a substrate as an insulation system for damping sound insulation, where said substrate optionally contains a layer selected from the group of a heavy layer or a carpet.

4. The article according to claim 3, characterized in that when a carpet is laid on the insulation system a decoupler of soft elastic, predominantly open pored material is arranged between the heavy layer of the insulation system and the carpet.

5. The article according to claim 4, characterized in that the decoupler consists essentially of foam material.

6. The article according to claim 4, characterized in that the decoupler consists essentially of acoustically effective fleece or felt.

7. The article according to claim 4, characterized in that the decoupler is thin, in the region of about 5 mm.

8. The article according to claim 4, characterized in that the layers subsequently added and held by adhesive forces have acoustic damping properties.

9. The article according to claim 3, characterized in that the adhesive coating is formed over the whole or part of said substrate.

10. The article according to claim 3, characterized in that the adhesive layer is provided with covers selected from a member of the group of cardboard, Kraft paper, injectable or hardenable plastics materials.

11. The article of claims 1 or 2 where said NCO index is $\leq 70$.

12. The article of claim 3 where said foam is obtained by reacting a polyisocyanate or polyisocyanate prepolymer with an excess of polyols or mixtures thereof whilst maintaining an NCO index of $\leq 80$ for the purpose of obtaining an adhesive surface and further characterized by a density of 80 to 250 kg/m$^3$, a modulus of elasticity of $<300,000$ N/m$^2$ and a loss factor of at least 0.4.

13. The article of claims 3 or 12 where said NCO index is $\leq 70$.

14. The article of claims 3, 12 or 13 where said substrate is sheet metal.

15. The article of claims 3, 12 and 13 where said substrate is a vehicle section.

16. The article of claim 15 where said vehicle section is fabricated from sheet metal.

* * * * *

UNITED STATES PATENT AND TRADEMARK OFFICE
CERTIFICATE OF CORRECTION

PATENT NO. : 4,839,397
DATED : June 13, 1989
INVENTOR(S) : Dr. Ernst Lohmar, et al.

It is certified that error appears in the above-identified patent and that said Letters Patent is hereby corrected as shown below:

Column 1, line 37: "foan" should read as --foam--

Column 2, line 67: "sow" should read as --show--

Column 3, line 38: "mounted" should read as --mould--

Figure 3:
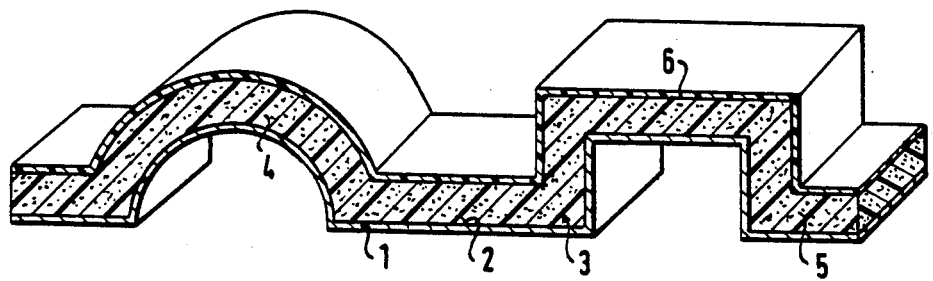

Column 4, line 7: "FIGS. 4 and 4," should read as --FIGS. 3 and 4,--

Column 4, line 33: "question" should read as --operation--

Column 4, line 55, Claim 1: "adhesive surface" should read as --adhesive (frictional) surface--

Signed and Sealed this

Twenty-fourth Day of April, 1990

Attest:

HARRY F. MANBECK, JR.

Attesting Officer

Commissioner of Patents and Trademarks